(12) United States Patent
Suk

(10) Patent No.: US 9,329,037 B2
(45) Date of Patent: May 3, 2016

(54) SYSTEM AND METHOD FOR PHOTOGRAPHING MOVING SUBJECT BY MEANS OF FIXED CAMERA, AND ACQUIRING PROJECTION IMAGE OF ACTUAL MOVEMENT TRAJECTORY OF SUBJECT BASED ON PHOTOGRAPHED IMAGE

(71) Applicant: CREATZ INC., Seoul (KR)

(72) Inventor: Yong Ho Suk, Seongnam-si (KR)

(73) Assignee: CREATZ INC., Seoul (KR)

( * ) Notice: Subject to any disclaimer, the term of this patent is extended or adjusted under 35 U.S.C. 154(b) by 95 days.

(21) Appl. No.: 14/346,734

(22) PCT Filed: Sep. 24, 2012

(86) PCT No.: PCT/KR2012/007669
§ 371 (c)(1),
(2) Date: Mar. 23, 2014

(87) PCT Pub. No.: WO2013/043019
PCT Pub. Date: Mar. 28, 2013

(65) Prior Publication Data
US 2014/0226869 A1    Aug. 14, 2014

(30) Foreign Application Priority Data

Sep. 23, 2011    (KR) .......................... 10-2011-0096352

(51) Int. Cl.
*G06K 9/00*    (2006.01)
*G01C 11/02*    (2006.01)
(Continued)

(52) U.S. Cl.
CPC ............ *G01C 11/02* (2013.01); *A63B 24/0021* (2013.01); *A63B 71/022* (2013.01); *A63F 13/005* (2013.01); *G06T 7/20* (2013.01); *G06T 7/204* (2013.01); *G06T 7/2033* (2013.01); *A63B 2024/0034* (2013.01); *G01C 2011/36* (2013.01); *G06T 2207/10016* (2013.01); *G06T 2207/10028* (2013.01); *G06T 2207/10048* (2013.01);
(Continued)

(58) Field of Classification Search
None
See application file for complete search history.

(56) References Cited

U.S. PATENT DOCUMENTS

| 6,104,438 A * | 8/2000 | Saito | H04N 5/222 348/239 |
| 2005/0023763 A1* | 2/2005 | Richardson | 273/348 |

(Continued)

OTHER PUBLICATIONS

Golf Achiever. Using Camera Technology to "Measure Golf Launch Parameters?" Golf Achiever, Stroboscopic Tech, Feb. 19, 2009.*

*Primary Examiner* — Aaron W Carter
*Assistant Examiner* — Oneal R Mistry

(57) ABSTRACT

The present invention relates to a system and method for photographing a moving subject by means of a fixed camera, and acquiring a projection image of the actual movement trajectory of the subject on the basis of the photographed image. One embodiment of the present invention provides a method for acquiring a projection image of the actual movement trajectory of a subject, the method comprising: a step for photographing a moving subject by means of a fixed camera; and a step for converting the coordinates of the photographed image of the subject on the camera image frame to coordinates of the image on an actual background portion, the conversion being implemented on the basis of information on mapping between coordinates on an actual background portion having a specific pattern, acquired by pre-photographing, with a fixed camera, the specific pattern of the actual background portion, and the coordinates on the camera image frame of the photographed image thereof.

6 Claims, 3 Drawing Sheets

(51) Int. Cl.
*G06T 7/20* (2006.01)
*A63B 24/00* (2006.01)
*A63B 71/02* (2006.01)
*A63F 13/00* (2014.01)
*G01C 11/36* (2006.01)

(52) U.S. Cl.
CPC ............... *G06T2207/30224* (2013.01); *G06T 2207/30241* (2013.01)

(56) References Cited

U.S. PATENT DOCUMENTS

| | | | |
|---|---|---|---|
| 2006/0008116 A1* | 1/2006 | Kiraly | G06T 7/0018 382/103 |
| 2009/0042627 A1* | 2/2009 | Nicora | 463/2 |
| 2009/0295624 A1* | 12/2009 | Tuxen | 342/147 |
| 2010/0210377 A1* | 8/2010 | Lock | A63B 24/0003 473/409 |

\* cited by examiner

SYSTEM AND METHOD FOR PHOTOGRAPHING MOVING SUBJECT BY MEANS OF FIXED CAMERA, AND ACQUIRING PROJECTION IMAGE OF ACTUAL MOVEMENT TRAJECTORY OF SUBJECT BASED ON PHOTOGRAPHED IMAGE

CROSS-REFERENCE TO RELATED APPLICATION

Cross-reference is made to another application entitled, "SYSTEM AND METHOD FOR PHOTOGRAPHING MOVING SUBJECT BY MEANS OF MULTIPLE CAMERAS, AND ACQUIRING ACTUAL MOVEMENT TRAJECTORY OF SUBJECT BASED ON PHOTOGRAPHED IMAGES" and filed on the same date as this application by the present applicant. Therefore, those skilled in the art to which the present invention pertains may refer to the invention of the above other application to understand or practice the present invention, or vice versa.

FIELD OF THE INVENTION

The present invention relates to a system and method for photographing a moving subject by means of a fixed camera and acquiring a projection image of an actual movement trajectory of the subject on the basis of the photographed images thereof.

BACKGROUND

Virtual golf systems are widely spreading which allow golfers to virtually play golf at low cost in downtown areas and the like. The basic concept of such virtual golf systems is to acquire a number of photographed images of a golf ball upon being hit by a golfer, measure physical quantities of the golf ball on the basis of the trajectory, interval, size and the like thereof, perform a simulation of the shot, and display a result of the simulation on a screen. In some cases, it may be much required in the virtual golf systems to acquire a projection image of an actual movement trajectory of a moving golf ball on the basis of the photographed images of the golf ball.

Therefore, following the introduction of a remarkable virtual golf system in Korean Patent No. 1048864 (entitled, "METHOD OF MEASURING PHYSICAL QUANTITIES OF OBJECT BY USING SINGLE LIGHT SOURCE AND PLANAR SENSOR UNIT AND VIRTUAL GOLF SYSTEM UTILIZING SAME") (the contents of which are incorporated herein by reference in its entirety), the inventor(s) now present a novel technique to combine with such virtual golf systems, other virtual golf systems, systems for virtually playing other kinds of sports (e.g., baseball, football, etc.), virtual reality systems for subjects other than balls, or the like to enable them to produce sufficiently good simulation results just using some economical components.

SUMMARY OF THE INVENTION

One object of the present invention is to acquire a projection image of an actual movement trajectory of a moving ball on the basis of photographed images of the ball.

Another object of the invention is to enable a virtual sport system to produce a sufficiently good simulation result just using some economical components.

Yet another object of the invention is to acquire a projection image of an actual movement trajectory of a moving subject on the basis of photographed images of the subject.

According to one aspect of the invention to achieve the objects as described above, there is provided a method for acquiring a projection image of an actual movement trajectory of a subject, comprising: photographing a moving subject by means of a fixed camera; and converting the coordinates on a camera image frame of the photographed images of the subject into the coordinates on an actual background region of the images, wherein as specific patterns of the actual background region are photographed by the fixed camera in advance, the coordinates on the actual background region of the specific patterns are acquired, and wherein the conversion is performed on the basis of information on mapping between the coordinates on the actual background region of the specific patterns and the coordinates on the camera image frame of the photographed images thereof.

In addition, there may be provided other methods and systems to implement the present invention.

According to the invention, a projection image of an actual movement trajectory of a moving ball may be acquired on the basis of photographed images of the ball.

According to the invention, a virtual sport system may produce a sufficiently good simulation result just using some economical components.

According to the invention, a projection image of an actual movement trajectory of a moving subject may be acquired on the basis of photographed images of the subject.

DETAILED DESCRIPTION OF THE PREFERRED EMBODIMENTS

Figure 1:
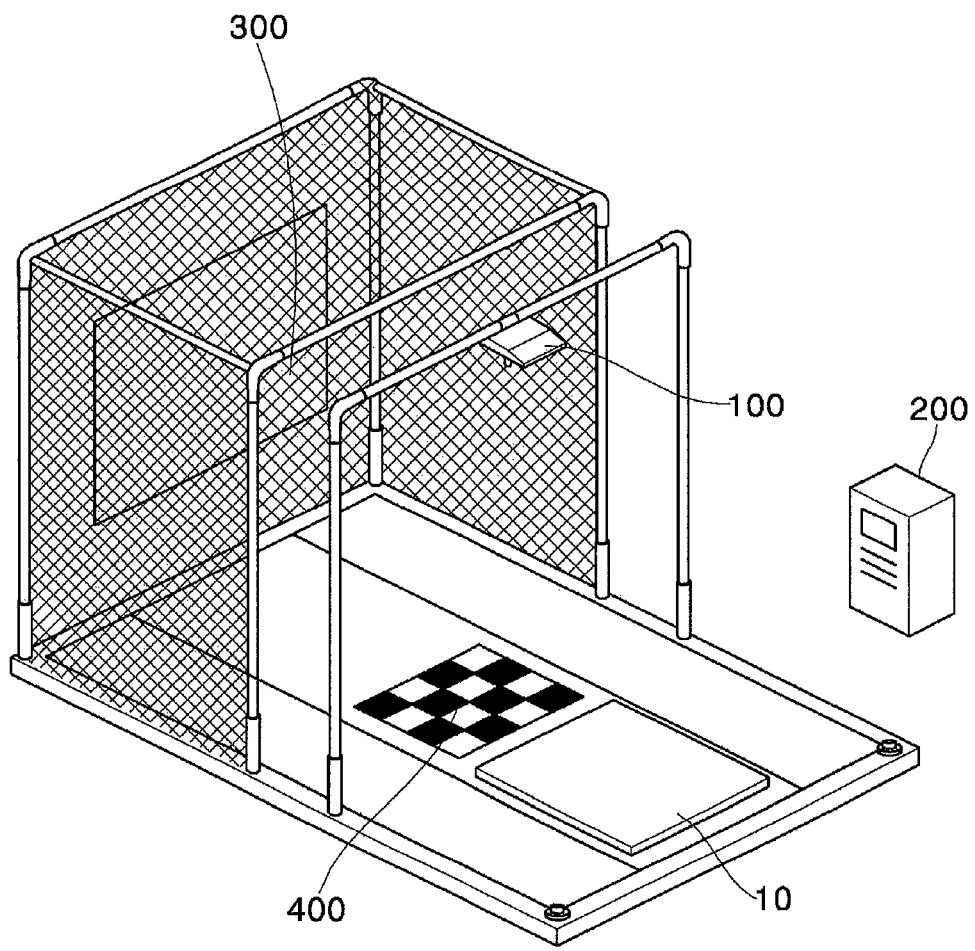
FIG. 1 is a schematic diagram of the overall configuration of a virtual golf system according to one embodiment of the invention.

In the following detailed description of the invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, or characteristics described herein may be implemented as modified from one embodiment to another embodiment without departing from the spirit and the scope of the invention. Furthermore, it shall be understood that the locations or arrangements of individual elements within each embodiment may be also modified without departing from the spirit and the scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of Overall System

FIG. 1 is a schematic diagram of the overall configuration of a virtual golf system according to one embodiment of the invention.

As shown in FIG. 1, the virtual golf system may be configured to comprise a shot unit 10, a photographing unit 100, a simulator 200, a display device 300 and a reference pattern unit 400.

First, the shot unit 10 according to one embodiment of the invention may be a part on which a golfer steps up to place and hit a golf ball when using the virtual golf system. The shot unit 10 may comprise a known swing plate, the tilt angle of which may be adjusted. It will be note that when the invention is applied to other kinds of virtual sport systems, those skilled in the art may modify the configuration of the shot unit 10 and, if necessary, those of other components associated therewith to suit to the characteristics of the corresponding sports.

Next, the photographing unit 100 according to one embodiment of the invention may comprise at least one camera (preferably infrared camera) and perform a function to acquire images of the moving golf ball.

As shown in FIG. 1, the photographing unit 100 may be disposed in a location to look down at the moving golf ball, while it may be disposed in other locations. Preferably, the photographing unit 100 is fixed to the structure as shown in FIG. 1 so that the location and view direction thereof may be invariable. The photographing unit 100 may face the reference pattern unit 400 to be described below.

The detailed configuration of the photographing unit 100 will be further described later with reference to FIG. 2.

Next, the simulator 200 according to one embodiment of the invention may perform a function to receive the photographed images of the moving golf ball from the photographing unit 100, acquire a projection image in which an actual movement trajectory of the golf ball is projected on an actual background region of the photographed images, and perform a simulation on the basis thereof.

The simulator 200 may communicate with the photographing unit 100 and the display device 300, and may comprise a dedicated processor for virtual golf simulation. The dedicated processor may be provided with memory means and have numerical operation and graphics processing capabilities. The simulator 200 may be similar to conventional virtual golf simulation devices.

The configuration of the simulator 200 will be further described later with reference to FIG. 3.

Next, the display device 300 according to one embodiment of the invention may perform a function to display a result of the numerical operation or graphics processing of the simulator 200. The display device 300 may display images via display means, and may preferably be configured with a screen, which absorbs the impact of the hit golf ball and does not emit light directly, and a projector to output images on the screen.

Lastly, the reference pattern unit 400 according to one embodiment of the invention may be a simple printed plate that is disposed facing the photographing unit 100 to display some patterns, or an electronic display that is disposed facing the photographing unit 100 and programmed to display some patterns. In the latter case, the reference pattern unit 400 may display the patterns in cooperation with a control unit 130 of the photographing unit 100 to be described below. For example, the reference pattern unit 400 may provide known checkerboard patterns or square grid patterns for camera calibration. However, the reference pattern unit 400 is not necessarily required to practice the present invention, and in some cases the appearance of a ground surface or another background region may be employed instead of the patterns of the reference pattern unit 400.

Configuration of Photographing Unit

Hereinafter, the internal configuration of the photographing unit 100 according to one embodiment of the invention and the functions of the respective components thereof will be described.

Figure 2:
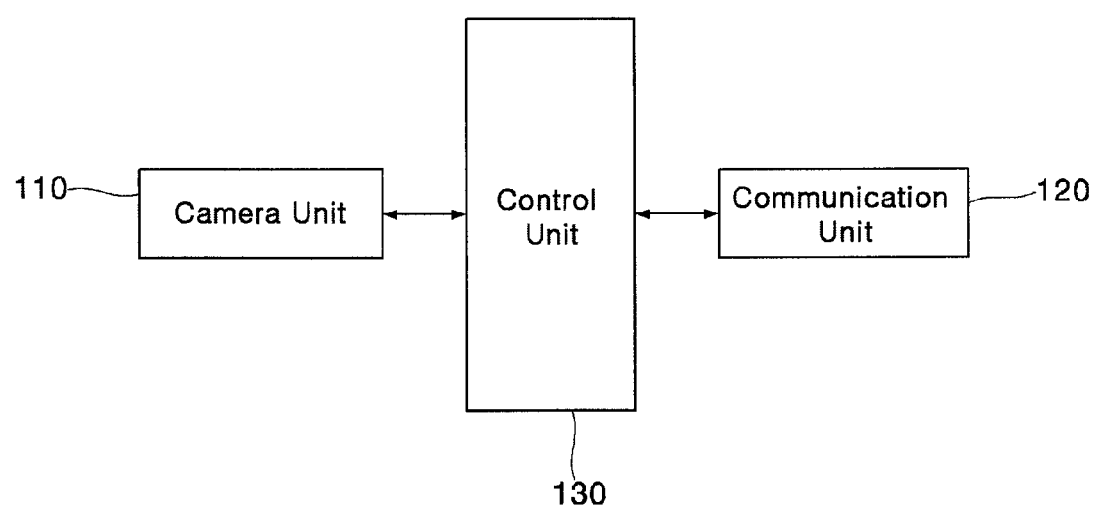
FIG. 2 is a detailed diagram of the internal configuration of a photographing unit 100 according to one embodiment of the invention.

FIG. 2 is a detailed diagram of the internal configuration of the photographing unit 100 according to one embodiment of the invention.

As shown in FIG. 2, the photographing unit 100 may be configured to comprise a camera unit 110, a communication unit 120 and a control unit 130.

According to one embodiment of the invention, at least some of the camera unit 110, the communication unit 120 and the control unit 130 may be program modules to communicate with the simulator 200. The program modules may be included in the photographing unit 100 in the form of operating systems, application program modules or other program modules, while they may be physically stored in a variety of commonly known storage devices. Further, the program modules may also be stored in a remote storage device that may communicate with the photographing unit 100. Meanwhile, such program modules may include, but not limited to, routines, subroutines, programs, objects, components, data structures and the like for performing specific tasks or executing specific abstract data types as will be described below in accordance with the present invention.

First, the camera unit 110 may comprise a camera that may optically acquire images of the moving golf ball. The camera unit 100 may transmit the photographed images of the moving golf ball to the control unit 130.

The camera of the camera unit 110 may be fixed to the structure as described above and then calibrated as necessary. The above calibration may be directed to calibrating the distortion of a camera image sensor or a lens according to conventional techniques.

Next, the communication unit 120 may perform a function to mediate data transmission/receipt between the control unit 130 and the simulator 200. Although there is no particular limitation on the communication modality that may be employed by the communication unit 120, wired communication such as wired LAN communication and cable communication, or wireless communication such as wireless LAN communication, infrared communication, RF communication and Bluetooth communication may preferably be employed.

Lastly, the control unit 130 may transmit to the simulator 200 the photographed images of the moving golf ball received from the camera unit 110.

Further, before or after the above transmission (but after the camera has been fixed to the structure), the control unit 130 may map multiple coordinates on the reference pattern unit 400 (i.e., the real-world coordinates) to the coordinates on a camera image frame of the patterns at the above multiple coordinates as photographed by the camera, respectively, and transmit information on the respective coordinate mapping to the simulator 200. For example, the above coordinate mapping relationship may be established between K coordinates on the reference pattern unit 400, $P_r(k)$ (for k=1 to K) and K coordinates on the camera image frame, $P_i(k)$ (for k=1 to K).

Further, the coordinate mapping relationship may be established by an administrator of the virtual golf system manually manipulating the photographing unit 100 and the reference pattern unit 400, or by programmed cooperation of the photographing unit 100 (particularly the control unit 130) and the reference pattern unit 400.

Configuration of Simulator

Hereinafter, the internal configuration of the simulator 200 according to one embodiment of the invention and the functions of the respective components thereof will be described.

Figure 3:
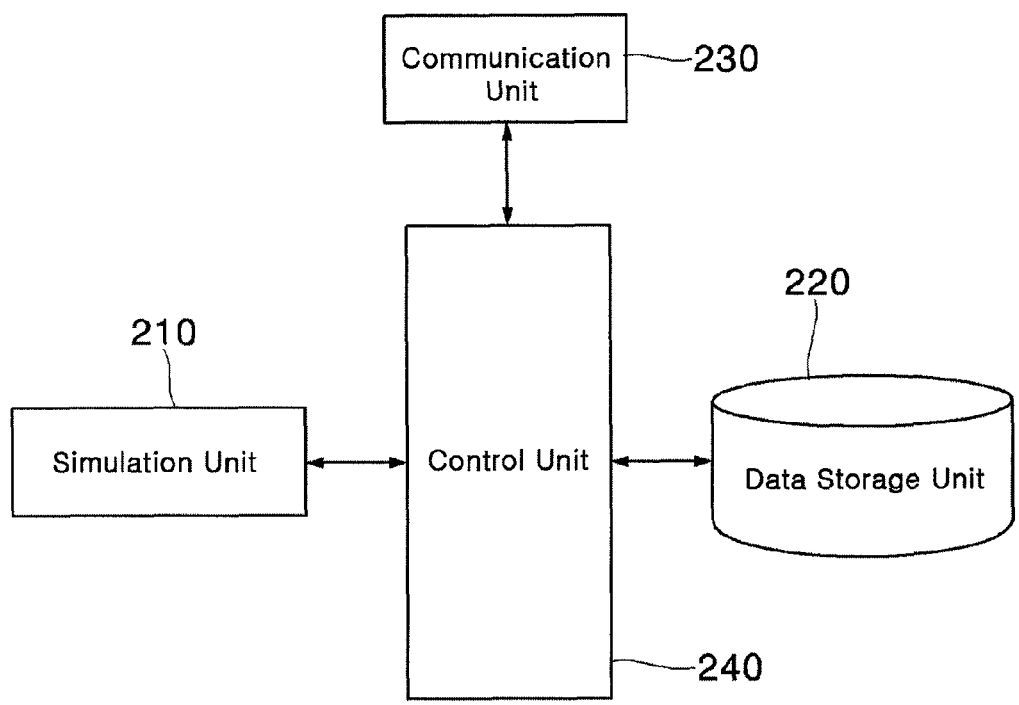
FIG. 3 is a detailed diagram of the internal configuration of a simulator 200 according to one embodiment of the invention.

FIG. 3 is a detailed diagram of the internal configuration of the simulator 200 according to one embodiment of the invention.

As shown in FIG. 3, the simulator 200 according to one embodiment of the invention may be configured to comprise a simulation unit 210, a data storage unit 220, a communication unit 230 and a control unit 240.

According to one embodiment of the invention, at least some of the simulation unit 210, the data storage unit 220, the communication unit 230 and the control unit 240 may be program modules to communicate with the photographing unit 100 or the display device 300. The program modules may be included in the simulator 200 in the form of operating systems, application program modules or other program modules, while they may be physically stored in a variety of commonly known storage devices. Further, the program modules may also be stored in a remote storage device that may communicate with the simulator 200. Meanwhile, such program modules may include, but not limited to, routines, subroutines, programs, objects, components, data structures and the like for performing specific tasks or executing specific abstract data types as will be described below in accordance with the present invention.

First, the simulation unit 210 may receive from the photographing unit 100 the aforementioned information on the coordinate mapping. Using the information, the simulation unit 210 may derive a coordinate conversion matrix to convert the coordinates on the camera image frame into the coordinates on an actual background region of the images such as the reference pattern unit 400, a ground surface and another background region, through the following exemplary procedure.

First, the received information on the coordinate mapping may be represented as follows:

The coordinates of K specific patterns of the reference pattern unit 400: $P_r(k)$ (for k=1 to K); and The coordinates on the camera image frame (i.e., the pixel coordinates) of the K specific patterns as photographed by the camera: $P_i(k)$ (for k=1 to K).

For convenience, we assume that $P_r=(x_r, y_r)$ and $P_i=(x_i, y_i)$. Then, considering the rotation effects of the conversion and the possible distortion thereof, the following equations (Eq. 1) may be established:

$$x_i a_{11} + y_i a_{21} + x_i y_i a_{31} + x_i^2 a_{41} + y_i^2 a_{51} + a_{61} = x_r$$

$$x_i a_{12} + y_i a_{22} + x_i y_i a_{32} + x_i^2 a_{42} + y_i^2 a_{52} + a_{62} = y_r$$

Eq. 1 may be expressed as the following matrix equation (Eq. 2):

$$P_i \cdot A = P_r,$$

where $$P_i = [x_i\ y_i\ x_i y_i\ x_i^2\ y_i^2\ 1],$$

$$A = \begin{bmatrix} a_{11} & a_{12} \\ a_{21} & a_{22} \\ a_{31} & a_{32} \\ a_{41} & a_{42} \\ a_{51} & a_{52} \\ a_{61} & a_{62} \end{bmatrix}, \text{ and } P_r = [x_r\ y_r].$$

For the mapping between the $k^{th}$ coordinates, the following equations (Eq. 3) are written:

$$P_i(k) = [x_i(k)\ y_i(k)\ x_i(k)y_i(k)\ x_i^2(k)\ y_i^2(k)\ 1], \text{ and}$$

$$P_r(k) = [x_r(k)\ y_r(k)].$$

Next, using the existing information on the mapping between the K coordinates, the coordinates on the camera image frame and those on the actual background region of the images may be respectively expressed as the following matrix equations (Eq. 4):

$$P_{r,k} = \begin{bmatrix} P_r(1) \\ P_r(2) \\ \ldots \\ P_r(K) \end{bmatrix}, \text{ and } P_{i,k} = \begin{bmatrix} \tilde{P}_i(1) \\ \tilde{P}_i(2) \\ \ldots \\ \tilde{P}_i(K) \end{bmatrix}.$$

Eventually, using the mapping between the K coordinates, Eq. 2 may be rewritten as the following equation (Eq. 5):

$$P_{i,K} \cdot A = P_{r,K}$$

Accordingly, the coordinate conversion matrix (comprised of estimated values) may be derived as the following equation (Eq. 6):

$$\overline{A} = (P_{i,K}^T \cdot P_{i,K})^{-1} P_{i,K}^T \cdot P_{r,K}.$$

Therefore, using the coordinate conversion matrix of Eq. 6, the simulation unit 210 may convert the coordinates on the camera image frame of the respective images of the moving golf ball (received from the control unit 130) into those on the actual background region of the images. Thus, just using the camera images of the moving golf ball, a projection image of the actual movement trajectory thereof may be derived operationally. In the inventions of other applications to which cross-reference may be made or elsewhere, such projection image may be usefully employed to recognize an actual movement trajectory or the like of a golf ball, even without multiple synchronized cameras.

Meanwhile, although it has been illustrated above that the simulation unit 210 of the simulator 200 may operationally derive the above projection image, it will be apparent to those skilled in the art that at least a part of the operational derivation procedure may be performed by other operational components such as the control unit 130 of the photographing unit 100.

Next, the data storage unit 220 may store the information on the coordinate mapping or other information required for the simulation. The data storage unit 220 may comprise a computer-readable recording medium.

Next, the communication unit 230 may perform a function to enable data transmission/receipt to/from the simulation unit 210 and the data storage unit 220. Although there is no particular limitation on the communication modality that may be employed by the communication unit 230, wired communication such as wired LAN communication and cable communication, or wireless communication such as wireless LAN communication, infrared communication, RF communication and Bluetooth communication may preferably be employed.

Lastly, the control unit 240 may perform a function to control data flow among the simulation unit 210, the data storage unit 220 and the communication unit 230. That is, the control unit 240 according to the present invention may control data flow into/out of the simulator 200 or data flow among the respective components of the simulator 200, such that the simulation unit 210, the data storage unit 220 and the communication unit 230 may carry out their particular functions, respectively.

Although it has been mainly described above that the system of the present invention is a virtual golf system, it will be apparent to those skilled in the art that the technical principle and configuration of the invention may be applied to all kinds of virtual reality systems (e.g., virtual baseball systems or virtual football systems) requiring simulation of the movement of a subject.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described in terms of specific items such as detailed elements as well as the limited embodiments and the drawings, they are only provided to help general understanding of the invention, and the present invention is not limited to the above embodiments. It will be appreciated by a person of ordinary skill in the art that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for acquiring a projection image of an actual movement trajectory of a subject, comprising:
    photographing a moving subject by means of a fixed camera; and
    converting the coordinates on a camera image frame of the photographed images of the subject into the coordinates on an actual background region of the images,
    wherein as specific patterns of the actual background region are photographed by the fixed camera in advance, the coordinates on the actual background region of the specific patterns are acquired, and
    wherein the conversion is performed on the basis of information on mapping between the coordinates on the actual background region of the specific patterns and the coordinates on the camera image frame of the photographed images thereof, and
    wherein the conversion is performed by a coordinate conversion matrix as follows:

$$\overline{A} = (P_{i,K}^T \cdot P_{i,K})^{-1} P_{i,K}^T \cdot P_{r,K}.$$

where $$P_{r,k} = \begin{bmatrix} P_r(1) \\ P_r(2) \\ \ldots \\ P_r(K) \end{bmatrix}$$

is a matrix of the coordinates on the actual background region of K specific patterns, and $$P_{i,k} = \begin{bmatrix} \tilde{P}_i(1) \\ \tilde{P}_i(2) \\ \ldots \\ \tilde{P}_i(K) \end{bmatrix}$$

is a matrix of the coordinates on the camera image frame of the photographed images thereof.

2. A method as claimed in claim 1, wherein the camera is fixed facing a ground surface.

3. A method as claimed in claim 1, wherein the actual background region is a ground surface.

4. A method as claimed in claim 1, wherein the specific patterns are included in patterns for camera calibration.

5. A method as claimed in claim 1, wherein the specific patterns are generated by a programmed reference pattern display.

6. A system for acquiring a projection image of an actual movement trajectory of a subject, comprising:
    a fixed camera to photograph a moving subject; and
    an operational device to convert the coordinates on a camera image frame of the photographed images of the subject into the coordinates on an actual background region of the images,
    wherein as specific patterns of the actual background region are photographed by the fixed camera in advance, the coordinates on the actual background region of the specific patterns are acquired, and
    wherein the conversion is performed on the basis of information on mapping between the coordinates on the actual background region of the specific patterns and the coordinates on the camera image frame of the photographed images thereof, and
    wherein the conversion is performed by a coordinate conversion matrix as follows:

$$\overline{A} = (P_{i,K}^T \cdot P_{i,K})^{-1} P_{i,K}^T \cdot P_{r,K}.$$

where $$P_{r,k} = \begin{bmatrix} P_r(1) \\ P_r(2) \\ \ldots \\ P_r(K) \end{bmatrix}$$

is a matrix of the coordinates on the actual background region of K specific patterns, and $$P_{i,k} = \begin{bmatrix} \tilde{P}_i(1) \\ \tilde{P}_i(2) \\ \ldots \\ \tilde{P}_i(K) \end{bmatrix}$$

is a matrix of the coordinates on the camera image frame of the photographed images thereof.

* * * * *